United States Patent [19]
Ganesan

[11] Patent Number: 5,535,276
[45] Date of Patent: Jul. 9, 1996

[54] YAKSHA, AN IMPROVED SYSTEM AND METHOD FOR SECURING COMMUNICATIONS USING SPLIT PRIVATE KEY ASYMMETRIC CRYPTOGRAPHY

[75] Inventor: Ravi Ganesan, Arlington, Va.

[73] Assignee: Bell Atlantic Network Services, Inc., Arlington, Va.

[21] Appl. No.: 338,128

[22] Filed: Nov. 9, 1994

[51] Int. Cl.$^6$ ........................................... H04K 1/00
[52] U.S. Cl. ................................. 380/25; 380/23; 380/4; 380/46; 380/49; 380/21
[58] Field of Search ..................... 380/23, 25, 4, 380/46, 49, 21

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,995,082 | 2/1991 | Schnorr . |

OTHER PUBLICATIONS

R. L. Rivest, A. Shamir & L. Adleman, "A Method for Obtaining Digital Signatures and Public–key Cryptosystems", CACM, vol. 21, pp. 120–126, Feb. 1978.
M. J. Weiner, "Cryptanalysis of Short RSA Secret Exponents", IEEE Transaction on Information Theory, vol. 36, No. 3, pp. 553–558.
C. Boyd, Cryptography and Coding: "Digital Multisignatures", 15–17 Dec. 1986, pp. 241–246.
Kohl, John et al., "The Kerberos™ Network Authentication Service (V5)", Internet–Draft, Sep. 1, 1992, pp. 1–69.
Bellovin, Steven M. et al., "Encrypted Key Exchange: Password–Based Protocols Secure Against Dictionary Attacks", IEE, 1992, pp. 72–84.
Schneier, B., "Applied Cryptography, Protocols, Algorithms and Source Code in C", pp. 428–436, John Wiley & Sons, NY 1994 (re Kent, S., Privacy Enhancement for Internet Electronic Mail: Part II: Certificate Based Key Management, Internet RFC 1422, Feb. 1993).
Schneier, B., "Applied Cryptography Protocols, Algorithms and Source Code in C", p. 424, John Wiley & Sons NY 1994 (re Kohl, J. T., The Evolution of the Kerberos Authentication Service, EurOpen Conference Proceedings, May 1991).

Primary Examiner—David C. Cain
Attorney, Agent, or Firm—Lowe, Price, LeBlanc & Becker

[57] ABSTRACT

In a system, such as a system utilizing a Kerberos protocol, system users each have an associated asymmetric crypto-key. The security of communications over the system is enhanced by a first user generating a temporary asymmetric crypto-key having a first temporary key portion and an associated second temporary key portion. The second temporary key portion is encrypted by the first user with the first private key portion of the first user crypto-key to form a first encrypted message. Another user, preferably an authentication server, applies the second private key portion and the public key portion of the first user crypto-key to the first encrypted message to decrypt the second temporary key portion and thereby authenticate the first user to the security server. The authentication server then encrypts the first encrypted message with the second private key portion of the first user crypto-key to form a second encrypted message. The first user next applies the public key portion of the first user crypto-key to decrypt the second encrypted message and obtain the second temporary key portion, thereby authenticating the security server to the first user.

37 Claims, 5 Drawing Sheets

YAKSHA, AN IMPROVED SYSTEM AND METHOD FOR SECURING COMMUNICATIONS USING SPLIT PRIVATE KEY ASYMMETRIC CRYPTOGRAPHY

BACKGROUND OF INVENTION

1. Field Of The Invention

The present invention relates generally to securing communications using cryptography. More particularly, the present invention provides a method and system for enhancing the security of communications using asymmetric crypto-keys and is especially useful in enhancing communication security in conventional Kerberos authentication systems.

2. Description of the Related Art

Cryptosystems have been developed for maintaining the privacy of information transmitted across a communications channel. Often, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical keys.

In more technical terms, a symmetric cryptosystem comprises an encryption function E, a decryption function D, and a shared secret-key, K. The key is a unique string of data bits to which the functions are applied. Two examples of encipherment/decipherment functions are the National Bureau of Standards Data Encryption Standard (DES) and the more recent Fast Encipherment Algorithm (FEAL). To transmit a message, M, in privacy, the sender computes C=E(M,K), where C is referred to as the ciphertext. Upon receipt of C, the recipient computes M =D (C,K), to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock with two non-identical keys associated with it. For example, in an RSA system, either key can be used to unlock the box to retrieve a message which has been locked in the box by the other key. However, the system could be limited to using the keys in a particular sequence, such that the box can only be locked with the one key and unlocked with the other key.

In public key electronic cryptosystems, each entity, has a private key, d, which is known only to the entity, and a public key, eN, which is publicly known. Once a message is encrypted with a user's public-key, it can only be decrypted using that user's private-key, and conversely, if a message is encrypted with a user's private-key, it can only be decrypted using that user's public-key. It will be understood by those familiar with the art that although the terms "encrypt" and "decrypt" and derivations thereof are used herein in describing the use of public and private keys in an asymmetric public key cryptosystem, the term "transform" is commonly used in the art interchangeably with the term "encrypt" and the term "invert" is commonly used in the art interchangeably with the term "decrypt". Accordingly, as used herein in describing the use of public and private keys, the term "transform" could be substituted for the term "encrypt" and the term "invert" could be substituted for the term "decrypt".

If sender x wishes to send a message to receiver y, then x, "looks-up" y's public key eN, and computes $M=E(C,e_y)$ and sends it to y. User y can recover M using its private-key $d_y$, by computing $C=D(M,d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=E(M,d_x)$ and sends [M,S] to y. User y "looks-up" x's public-key $e_x$, and then checks to see if $M=D(S,e_x)$. If it does, then y can be confident that x signed the message, since computing S, such that $M=D(S,e_x)$, requires knowledge of $d_x$, x's private key, which only x knows.

Public-key cryptography also provides a convenient way of performing session key exchange, after which the key that was exchanged can be used for encrypting messages during the course of a particular communications session and then destroyed, though this can vary depending on the application.

One public key cryptographic system is the Rivest, Shamir, Adleman (RSA) system, as described in Rivest, Shamir and Adleman, "A Method of Obtaining Digital Signatures and Public Key Cryptosystems", CACM, Vol 21, pp 120–126, February 1978. RSA is a public-key based cryptosystem that is believed to be very difficult to break. In the RSA system the pair $(e_i,N_i)$, is user i's public-key and $d_i$ is the user's private key. Here $N_i=pq$, where p and q are large primes. Here also $e_id_i=1\bmod\phi(N_i)$, where $\phi(N_i)=(p-1)(q-1)$ which is the Euler Toitient function which returns the number of positive numbers less than $N_i$, that are relatively prime to $N_i$. A Carmichael function is sometime is used in lieu of a Euler Toitient function.

To encrypt a message being sent to user j, user i will compute $C=M^{(e_j)}\bmod N_j$ and send C to user j. User j can then perform $M=C^{(d_j)}\bmod N_j$ to recover M. User i could also send the message using his signature. The RSA based signature of user i on the message, M, is $M^{d_i}\bmod N_i$. The recipient of the message, user j, can perform $(M^{(d_i)}\bmod N_i)^{(e_i)}\bmod N_i$, to verify the signature of i on M.

In a typical mode of operation, i sends j, $M^{(d_i)}\bmod N_i$ along with M and a certificate $C=(i,e_i,N_i)^{(d_{CA})}\bmod N_{CA}$, where C is generated by a Certificate Authority (CA) which serves as a trusted off-line intermediary. User j can recover i's public key from C, by performing $C^{(e_{CA})}\bmod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented. Such an approach is described in "Digital Multisignature", C. Boyd, Proceedings of the Inst. of Math, and its Appl. on Cryptography and Coding, 15–17 Dec. 1986. The proposed approach extends the RSA system by dividing or splitting the user private key d into two or more portions, say $d_a$ and $d_b$, where $d_a*d_b=d$.

"A Secure Joint Signature and Key Exchange System", Bellcore Technical Document see also U.S. patent application Ser. No. 08/277,808, which is also assigned to the assignee of the present application, modified Boyd's system, and made four significant additional points regarding split private key asymmetric cryptosystems. Although specifically applied to the two party case, the findings can be utilized more generally. The first point is that, assuming all operations are modulo N, breaking the joint signature system is equivalent to breaking RSA. This is true whether the attacker is an active or passive eavesdropper or one of the system users. It is assumed that key generation is conducted by a trusted third party, for example a tamper proof chip, and the factors of the RSA modulus N and $\phi(N)$ are discarded after key generation and not known to any of the system users. The second point is the description of the following key exchange protocol: User 1 sends $c_1 = m_1^{d_1}$ to User 2. User 2 recovers $m_1 = c_1^{2_2 e}$. Similarly User 2 transmits $m_2$ to User 1. Each user then computes $m = f(m_1, m_2)$, where $f$ is a function like XOR. Page and Plant prove mathematically that breaking this scheme is equivalent to breaking RSA. Again this is true whether the attacker is an active or passive eavesdropper or one of the system users. The third point is the introduction of the concept that one of the two users is a central server which maintains one portion of every user's RSA private key. In order to sign a message the user must interact with this server which, it is shown, cannot impersonate the user. Having to interact with such a central server has several important practical advantages, including instant revocation without difficult to maintain Certificate Revocation Lists (CRL), Kent, S., "Privacy Enhancement for Internet Electronic Mail: Part II: certificate Based Key Management", INTERNET RFC 1422, February 1993, a central point for audit and, as discussed below, a method of providing for digital signatures in an era where smart cards are not yet ubiquitous. Finally, the paper also proves mathematically that even if one of the two portions, $d_1$, and $d_2$, of the private key, d is short, say 64 bits, an eavesdropper will have equal difficulty breaking the split key system as would be experienced in breaking RSA. As a consequence, a digital signature infrastructure can be built where users who remember short (8-9 characters) passwords, can interact with the central server to create RSA signatures which are indistinguishable from those created using a full size private key stored on a smart card.

One symmetric cryptosystem is the Kerberos authentication system, Kohl, J. T. and B. C. Neuman, "The Kerberos Network Authentication Service", INTERNET RFC 1510, September 1993, which is based on the classic Needham-Schroeder authentication protocols, Needham, R. M. and Schroeder M. D., "Using Encryption for Authentication in Large Networks of Computers", Communications of the ACM, v. 21, n. 12, December 1978, with extensions by Denning-Sacco, D. E. Denning and G. M. Sacco, "Timestamps in Key Distribution Protocols," Communications of the ACM, v. 24, n. 8, August 81, pp. 553-536. The system uses a trusted third party model to perform authentication and key exchange between entities in a networked environment, for example, over a local or wide area network. Kerberos uses symmetric key cryptosystems as a primitive, and initial implementations use the Data Encryption Standard (DES) as an interoperability standard, though any other symmetric encryption standard can be used. After close to a decade of effort, the Kerberos authentication system is now a fairly mature system whose security properties have held up fairly well to intense scrutiny. Further, vendors are now delivering Kerberos as a supported product. Kerberos has also been adopted as the basis for the security service by the Open Software Foundation's (OSF) Distributed Computing Environment (DCE). Consequently, Kerberos can be expected to be among the most widespread security systems used in distributed environments over the next several years.

For the sake of clarity, a "simplified" version of the Kerberos protocol described by Neuman and Ts'o in Neuman, B. C. and Ts'o, T., "Kerberos: An Authentication Service for Computer Networks", IEEE Communications, September 1994, will be discussed below. The complete protocol is described in Kohl, J. T. and Neuman, B. C., "The Kerberos Network Authentication Service", INTERNET RFC 1510, September 1993. Further, the following discussion is based on Neuman, B. C. and Ts'o, T., "Kerberos: An Authentication Service for Computer Networks", IEEE Communications, September 1994, and for the sake of consistency uses almost the same notation. The fundamental message exchanges are shown in FIG. 1. In message 1 the user uses a personal computer or workstation 10 to request a ticket granting ticket (TGT) from an authentication server (AS) 20. The server 20 creates such a ticket TGT, looks up the user's password from the Kerberos database 30, encrypts the TGT with the password and sends it to the user via the computer 10 in message 2. The user decrypts the TGT with her password using computer 10, and stores the TGT on computer 10, for example on a hard disk or in the random access memory (RAM). Then, when the user desires to access a service, she sends message 3, which contains the TGT to the ticket granting server 40. The server 40 verifies the TGT and sends back, in message 4, a service ticket to access the service server 50, and a session key, encrypted with the user's password retrieved from database 30. In message 5 the user presents via computer 10 the service ticket to the server 50, which verifies it and also recovers the session key from it. If mutual authentication is required, the server 50, in message 6, sends back a message encrypted with the session key. All communications between servers 20, 40 and 50 and computer 10 are via network 60. All communications between servers 20 and 40 and database 30 are preferably by direct communications link.

The Kerberos messages will now be described in further detail. Message 1 known as as_req (request to authentication service), consists of:

$$\text{as\_req: c,tgs,time-exp, n} \qquad (1)$$

where c is the name of the client (user), and tgs is the name of the ticket granting service associated with server 50, for which the client is requesting a ticket granting ticket and time-exp is the requested expiry time of the ticket, e.g. eight hours, and n is a fresh random number. This message is sent from computer 10 in the clear, and all parts of it are visible to an eavesdropper. The authentication server 20 responds with Message 2, with $$\text{as\_rep: \{Kc,tgs, time-exp, n, ... \} Kc,\{Tc,tgs\}Ktgs} \qquad (2)$$

where Kc,tgs is the symmetric session key to be shared between the ticket granting server (tgs) 40 and the user for the lifetime of this ticket. Kc,tgs and the other information is encrypted with symmetric key Kc which is the user's password, i.e. the long term secret which is shared with the Kerberos server. Only a user who knows Kc will be able to decrypt this message to obtain Kc,tgs. The key Kc,tgs is also embedded in the ticket Tc,tgs, which in the as_rep is encrypted using Ktgs, a long term key known only to the server 20 and the server 40. After decrypting the first part of the message on computer 10, the user stores the data received in the as_rep on computer 10. The main purpose of this process is to avoid storing the long term key Kc on the computer 10 where it may be compromised. Rather, the key Kc,tgs is used in subsequent communications in lieu of Kc. Since Kc,tgs is relatively short lived, the damage an attacker can cause by learning this key is significantly less than the damage which might be caused by compromise of long term key Kc. It is worth observing that the server 20 does not verify the identity of the user before responding to a user's as_req with a as_rep. Rather server 20 relies on the fact that to be able to make any use of the as_rep, the recipient must know Kc. So not only can an attacker eavesdrop on the network to recover as_rep, but can actually get an as_rep from the server 20 by sending a fraudulent as_req. The attacker can then take the portion of the as_rep encrypted with Kc, and attempt to decrypt by taking guesses at Kc. Since Kc is typically a user selected password, Kc may well be a poor password, which the attacker can guess.

When the client wishes to obtain a ticket to access server 50, it sends to the server 40, Message 3, tgs_req: s, time-exp, n, {Tc,tgs}Ktgs, {ts . . . }Kc,tgs     (3)

This message consists of the name of the server 50, s, the requested expiry time, time,exp, and the random number n, in clear text. It also contains the encrypted ticket granting ticket {Tc,tgs}Ktgs which was received by the client computer 10 in the as_rep message. The server 40, which knows Ktgs, can decrypt and recover Tc,tgs, which is a valid ticket. In order to prevent a replay attack in which an attacker might gain some benefit by resending a valid {Tc,tgs}Ktgs at a later time, the tgs_req message also contains an authenticator, which is a time stamp, ts, a check sum and other data, all encrypted with the session key Kc,tgs. Since this session key is embedded in the ticket Tc,tgs, which the server 40 has recovered, the server 40 can decrypt the authenticator and verify the time stamp and check sum, etc. By maintaining a cache of recently received authenticators, the server 40 can detect replays.

Having verified the authenticity of the tgs_req, the server 40 responds with Message 4, tgs_rep: {Kc,s, time-exp, n, s, . . . }Kc,tgs, {Tc,s}Ks     (4)

This message is very similar in structure and purpose to the as_rep, message. The first part consists of a session key, expiry time, etc., encrypted with Kc,tgs. The client computer 10 can decrypt this to recover the session key and other information. The second portion is a ticket to access the server 50, encrypted with the long term key Ks shared by the server 50 and the server 40. The client using computer 10 now constructs Message 5 and sends it to the server 50, as follows:

ap_req: {ts,ck, . . . }Kc,s {Tc,s}Ks     (5)

This message is similar to the tgs_req, in that it contains an encrypted ticket {Tc,s}Ks which the server 50 can use to recover Tc,s, which authenticates the client to the server 50 and, among other information, contains the session key Kc,s. The server 50 then uses Kc,s to decrypt the first part of the message, the authenticator, which has a time-stamp, ts, a check-sum, ck, etc.

Having verified the authenticity of the client, the client computer 10 and server 50 are ready to communicate. However, in some cases the client may request mutual authentication, in which case the server 50 must first respond with message 6, ap_rep: {ts}Kc,s     (6)

which is basically proof that the server 50 successfully recovered Kc,s from the ticket Tc,s, which means the server knew Ks, which in turn is proof of authenticity of the server.

The actual protocol has a number of options and is more complex, but the basic structure is defined by these six messages. Those interested are referred to Kohl, J. T. and B. C. Neuman, "The Kerberos Network Authentication Service", INTERNET RFC 1510, September 1993, for more details.

Kerberos does have limitations, and among the more serious ones are (i) compromise of the central trusted on-line Kerberos server, or the central Kerberos database, is catastrophic, since it retains long term user secrets, (ii) Kerberos is vulnerable to password guessing dictionary attacks, and (iii) Kerberos does not provide non-repudiation services, i.e. digital signatures. The first limitation is intrinsic to the Needham Schroeder protocol when used with symmetric cryptosystems like DES. The second problem is significant because experience suggests that password guessing attacks tend to be far more common than most other forms of attacks, since they are simple and effective. Finally, Kerberos was designed to provide authentication and key-exchange, but it was not designed to provide digital signatures. However, organizations using Kerberos may also need to implement digital signatures, and must now maintain separate security infrastructures for conventional Kerberos and for digital signatures, which accordingly results in significant additional costs.

Digital Equipment Corporation's SPX system, Tardo, J., and K. Alagappan, "SPX Global Authentication Using Public-Key Certificates", Proceedings of the 1991 IEEE Symposium on Research in Security and Privacy, 1991, is an example of a system with a public key infrastructure which achieves many of the same goals as Kerberos without its associated limitations. However, the SPX system does not maintain the standard Kerberos authentication system whose security properties have been widely examined. Therefore the SPX system is substantially different than the Kerberos protocol and the Kerberos source tree. In particular, the SPX system's protocol is sufficiently different from Kerberos to make integration of these systems require a complete reworking of the Kerberos protocol.

Bellovin and Merritt's Encrypted Key Exchange (EKE), Bellovin, S. M. and M. Merritt, "Encrypted Key Exchange: Password-Based Protocols Secure Against Dictionary Attacks", Proceedings of the 1992 IEEE Computer Society Conference on Research in Security and Privacy, 1992, can potentially be integrated with Kerberos to prevent dictionary attacks. However, the EKE multi-pass protocol would require very significant changes to the Kerberos system. EKE assumes that the participants share a common long term secret.

It has been suggested, by at least one expert, Kohl, J. T., "The Evolution of the Kerberos Authentication Service", EurOpen Conference Proceedings, May 1991, as quoted in Schneier, B., Applied Cryptography: Protocols, Algorithms and Source Code in C, John Wiley and Sons, New York, 1994) that: "Taking advantage of public-key cryptography would require a complete reworking of the [Kerberos] protocol".

It will perhaps also be worthwhile to describe the taxonomy of dictionary type attacks on system security. Dictionary attacks are a common form of attack, and it is well-known that many systems (e.g. UNIX or Kerberos), Morris, R. and K. Thompson. "Password Security: A Case History", Communications of the ACM, 22(11), November 1979, are vulnerable, Karn, P. R. and D. C. Feldmeier, "UNIX password security—Ten years later", Advance in Cryptology—CRYPTO 89. G. Brassard (Ed.) Lecture Notes in Computer Science, Springer-Verlag, 1990, to them. However, all dictionary attacks are not alike.

There are four parameters to a dictionary attack: The first is the known plain text, S, which can take two forms. The first form is a string S1 which is known in advance to the attacker. An example of S1 is a string of zeroes. The second form is a string S2 which is not known to the attacker in advance, but which will be known when the attack is successful. An example of S2 is any string with some form of predictable redundancy, for instance, a time stamp. Another example is a number with particular, easily tested, mathematical properties, for instance, a prime, or a non-prime with no small factors. The second parameter is the ciphertext C, typically of the form F(S,k) where k is the password being sought. The third parameter is the password space P being guessed at. The attacker will take guesses p1, p2, . . . ,pN, until a pi which is equal to k is found. The fourth parameter is the function F and its inverse, assuming one exists, which are typically public information. Those skilled in the art will recognize that important distinctions exist between cases when F is an RSA or similar function rather than a DES or similar function.

These four parameters result in at least two distinct forms of dictionary attacks. The first is S1 type attacks. Here the attacker typically computes F(S1,pi) on all passwords in P until a pi where, F(S1,pi)=C is uncovered. This is the most dangerous form of attack since the attacker can (i) recompute the F(S1,pi) for all or many pi and (ii) amortize his attack against several users. UNIX is particularly vulnerable to such attacks. The second form of attack is S2 type attacks. Here the attacker is typically computing $F^{-1}$ (C,pi) and hoping to find an S2 which can be recognized. The attacker cannot start computations before C is captured. Further, since C will be different for each instance, no amortizations of the attack are possible. The Kerberos system is vulnerable to this form of attack.

A need exists for a system and method of securing communications in which the compromise of a central database, such as the database in a conventional Kerberos system, will not be catastrophic to overall system security, that is the attacker will not be able to use a compromised password or crypro key to impersonate a user. A need also remains for a system and method for securing communications which is not vulnerable to dictionary attacks. A still further need exist for a system and method for securing communications which provides a way for one user to authenticate itself to another user. Yet another need exists for a system and method for securing communications which facilitates digital signatures, being placed on a message to provide for non-repudiation. Additionally needed is a system and method for securing communications which can be used to enhance security in conventional Kerberos systems with minimum changes to the standard Kerberos protocol. Another need which continues to exist is for a system and method to secure communications which is compatible with the use of "smart cards". Finally, a system and method for securing communications is needed which allows the reuse of an authentication infrastructure for digital signature, that is the same key(s) should be available for both authentication and digital signatures and only a single secure database should be required for key storage.

Additional needs which can be satisfied by, as well as other advantages and novel features of, the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention, a method for securing communications over a system having a plurality of system users is provided. Each system user has an associated asymmetric crypro-key, such as an RSA crypto-key, with a public key portion and a corresponding private key portion. Each public key portion is known to the plurality of system users, and each private key portion has a first private key portion, which is preferably short in length, e.g. 8 to 12 characters, known only to the associated user and a corresponding second private key portion.

To enhance security of the communications between a first and second user over the system, a temporary asymmetric crypto-key, having a temporary private key portion and an associated temporary public key portion, is first generated, e.g. on a personal computer, workstation or other processing device, by a first user. The temporary public key portion is encrypted, by the first user, with the first private key portion of a crypto-key associated with the first user to form a first encrypted message.

A third user, e.g. a security or authentication server or processor, obtains the temporary public key portion by applying the second private key portion, typically retrieved from a secured database, and the public key portion of the first user crypto-key to the first encrypted message. This authenticates the first user to a third user. The third user can now further encrypt the first encrypted message with the second private key portion of the first user crypto-key to form a second encrypted message, which serves as a certificate having the temporary public key signed with both permanent private key portions of the first user's private key. Applying the public key portion of the first user crypto-key to decrypt the second encrypted message allows the first user to obtain the temporary public key portion, thereby authenticating the third user to the first user.

The third user encrypts a first message to the second user, such as an instruction to provide a ticket for service or the desired service itself, and a first symmetric session crypto-key, which might also be generated by the third user, with the second private key portion of a second user crypto-key associated with the second user to form a third encrypted message. Like the second private key portion of the first user crypto-key, the second private key portion of the second user crypto-key is preferably accessible and retrieved from a secured database. The second user could, for example be a ticket server in a Kerberos system or a service server of any type which might require secure communications. The third user also encrypts the first symmetric session crypto-key with the temporary public key portion to form a fourth encrypted message.

The first user can obtain the first symmetric session crypto-key by applying the temporary private key portion, which only the first user should know, to decrypt the fourth encrypted message. The first user also further encrypts the third encrypted message with the temporary private key portion to form a fifth encrypted message. Additionally, the first user encrypts a second message, such as a time stamp, with the first symmetric session key to form a sixth encrypted message.

The second user may now obtain the first message and the first symmetric session crypto-key by applying the temporary public key portion and the first private key portion of the second user crypto-key to decrypt the fifth encrypted message and thereby authenticate the first user and the third user. The second user also obtains the second message by applying the first symmetric session crypto-key to the sixth encrypted message.

The second user now encrypts a third message to the fourth user, for example a service server, and a second symmetric session key with the second private key portion of a crypto-key associated with the fourth user to form a seventh encrypted message. The second private key portion of the fourth user crypto-key is typically also retrieved from a secured database. The second user also encrypts the third encrypted message with the first private key portion of the second user crypto-key to form an eight encrypted message. Still further, the second user additionally encrypts the second symmetric session key with the first symmetric session key to form a ninth encrypted message.

The first user obtains the first message and the first symmetric session key by applying the public key portion of the second user crypto-key to the eight encrypted message. This authenticates the second user to the first user. The first user also obtains the second symmetric session key by apply the first symmetric session key to the ninth encrypted message. The seventh encrypted message is further encrypted by the first user with the temporary private key portion to form a tenth encrypted message. Additionally, the first user encrypts a fourth message to the fourth user with the second symmetric session key to form a eleventh encrypted message.

The fourth user can obtain the third message and the second symmetric session crypto-key by applying the temporary public key portion along with the first private key portion of the fourth user crypto-key to the tenth encrypted message. This authenticates the first and second users to the fourth user. By applying the second symmetric session crypto-key to the eleventh encrypted message the fourth user obtains the fourth message. The fourth user encrypts the seventh encrypted message with the first private key portion of the fourth user crypto-key to form a twelfth encrypted message. The first user obtains the third message and the second symmetric session key by applying the public key portion of the fourth user crypro-key to the twelfth encrypted message. This authenticates the fourth user to the first user. The second symmetric session crypto-key may also be used for encrypting and decrypting data communicated between said first and fourth users. It should be recognized that the second user, if desired, could also provide the second session key to another user, for example the FBI, to allow legal eavesdropping on communications between the first and fourth users without revealing the permanent private key of the first and fourth user.

In accordance with yet other aspects of the invention, joint signatures can be performed by two users, for instance the first and third users described above, using the temporary crypto-key. A hash message and a time stamp are encrypted by the one user with the first private key portion of that user's crypto-key to form an encrypted message. A signature of the user is thereby placed on the hash message. This user also encrypts this encrypted hash and time stamp message with the temporary private key portion and with the first private key portion of his user crypto-key to form a further encrypted message. The temporary public key portion is also encrypted by this user with the first private key portion of his user crypto-key to form another encrypted message.

Another user can now decrypt and obtain the temporary public key portion with the second private key portion and the public key portion of the first user's crypto-key. The temporary public key portion, thus obtained, along with the second private key portion and the public key portion of the first user's crypto-key are used by the later user to obtain the encrypted hash message and time stamp, that is the later user does not fully decrypt the message but rather only partially decrypts the message so that what remains is the hash message and time stamp encrypted with only the first private key portion of the first user's crypto-key, which as discussed previously is the signature of the first user on the hash message and time,stamp. As discussed above, the later user typically will retrieve the second private key portion of the first user's crypto-key from a secured database, such as that provided in conventional Kerberos systems. It also will be understood that the later user will, in appropriate cases, also fully decrypt the message and ensure that it is amenable to co-signing the message. The later user then further encrypts the partially decrypted message with the second private portion of the first user's cryptokey. The later user has thereby also signed the hash message and time stamp. This jointly signed message can now also be encrypted with the second temporary key portion. The first user can partially decrypt the message by applying the temporary private key portion, thereby leaving only the jointly signed message, i.e. the hash message and time stamp encrypted with the first and second private key portions of the first user's crypto-key. A still further user can now decrypt the hash message and time stamp using only the public key portion of the first user's crypto-key and thereby verify that the hash message and time stamp have been jointly signed.

According to still further aspects of the invention, the application of the public key portion of the first user crypto-key to decrypt the second encrypted message and obtain the temporary public key portion is performed multiple times so as to also authenticate the first and third users to the second user as well as the fourth user. Preferably, in order to defend against dictionary attacks, the first encrypted message includes a first random number string concatenated with the temporary public key portion, the fourth encrypted message includes a second random number string different from the first random number string concatenated with the first symmetric session key, and the ninth encrypted message includes a third random number string, different from the first and second random number strings, concatenated with the second symmetric session crypto-key. Likewise, the hash message and time stamp signed by the first user, i.e. encrypted with the first private key portion of the first user crypto-key preferably also has a random number string concatenated to it prior to being further encrypted with the first private key portion of the first user crypto-key and the temporary private key portion. Similarly, the jointly signed hash message and time stamp preferably has a different random number string concatenated to it prior to being further encrypted with the temporary public key portion. The asymmetric crypto-keys are applied using modular exponentiation and the temporary crypto-key has an associated expiration time.

In accordance with the system embodiment of the invention, a secure communications system has a plurality of system users, each having an associated asymmetric crypto-key with a public key portion and a corresponding private key portion. Each public key portion is known to the plurality of system users, and each private key portion has a first private key portion known only to the associated user and a corresponding second private key portion. The system includes a secured database, such as that provided as part of a conventional Kerberos system. A user processor such as a personal computer or workstation which is, for example operated by a first user is also included in the system. At least one server or processor, i.e. a second processor, which serves as a security server, is additionally provided as a secure third party intermediary between the first user and another user, which could be a service server. For example, in a conventional Kerberos system their is an authentication server and a ticket granting ticket server, either or both of which could comprise the security processor. To explain further, if the first user wishes to have access to the ticket granting ticket server in a conventional Kerberos system, then the authentication server would be the security processor or server. If the first user desires access to a service server, i.e. one which actually performs a desired service such as providing information etc., then both the authentication server and ticket granting ticket server of a conventional Kerberos system would be security servers. In this later case the third processor or server in the system would also be a security processor. The security processor(s) are linked directly to the secured database and by a communications network, which can be a local area network (LAN), wide area network or any other type of communications network over which secured communications are desired, to the first processor. One or more service servers which may be a third or fourth processor depending on the number of security processors are also connected to the first processor via the communications network.

The secure database stores each of the second private key portions. The first processor generates (i) a temporary asymmetric crypto-key having a temporary private key portion and an associated temporary public key portion, (ii) encrypts the temporary public key portion with the first private key portion of the first user's crypto-key to form a first encrypted message, and (iii) transmits the first encrypted message over the communications network.

The second processor, which is preferably a security processor or server, (i) retrieves the second private key portion of the first user crypro-key from the database, (ii) obtains the temporary public key portion by applying the second private key portion and the public key portion of the first user crypto-key to the first encrypted message, thereby authenticating the first user to the second processor, (iii) encrypts the first encrypted message with the second private key portion of the first user crypto-key to form a second encrypted message, and (iv) transmits the second encrypted message over the communications network.

The first processor obtains the temporary public key portion by applying the public key portion of the first user crypto-key to decrypt the second encrypted message and thereby authenticates the second processor to the first user.

We will assume, for purposes of the following discussion that it is desired that a communications session be arranged between the first and a second user, therefore the second or security processor will be considered a third system user. The second processor (i) retrieves the second private key portion of a second user crypto-key associated with the second user from the database, (ii) generates a first symmetric session crypto-key, (iii) encrypts a first message to the second user and the first symmetric session crypto-key with the second private key portion of the second user crypto-key to form a third encrypted message, (iv) encrypts the first symmetric session crypto-key with the temporary public key portion to form a forth encrypted message; and (v) transmits the third and fourth encrypted messages over the communications network. It should be noted that the first message could be an instruction to a Kerberos ticket granting ticket server to grant a ticket or an instruction to a service server to provide the desired service.

The first processor (i) obtains the first symmetric session crypto-key by applying the temporary private key portion to decrypt the fourth encrypted message, and (ii) encrypts the third encrypted message with the temporary private key portion to form a fifth encrypted message, (iii) encrypts a second message to the second user with the first symmetric session key to form a sixth encrypted message, and (iv) transmits the fifth and sixth encrypted messages over the communications network. The second message to the second user could for example be a time stamp.

A third processor or server, which serves as the network interface of the second user obtains the temporary public key portion by applying the public key portion of the first user crypto-key to the second encrypted message. The third processor then obtains the first message and the first symmetric session crypto-key by applying the temporary public key portion and the first private key portion of the second user crypto-key to decrypt the fifth encrypted message. This authenticates the first user and the third user to the second user. The third processor then obtains the second message by applying the first symmetric session crypto-key to the sixth encrypted message.

It will be understood that various features and aspects of the present invention can be implemented together or separately as may be desired for the particular application. Hence, in accordance with the present invention, the system might, in appropriate circumstances, only perform authentication of a user and a third party, such as an authentication server. The user, in such a case, encrypts a message with the first private key portion of his/her user asymmetric crypto-key to form a first encrypted message. The third party obtains the first message by applying the second private key portion, and typically the public key portion of the user crypto-key, to the first encrypted message, and thereby authenticates the user to the third party. The third party then encrypts the first encrypted message with the second private key portion of the user crypto-key to form a second encrypted message. The first user obtains the first message by applying the public key portion of his/her user crypto-key to decrypt the second encrypted message and thereby authenticates the third party.

Similarly, it may in certain cases be desirable only to require authentication of one user to another. This can be accomplished by one user encrypting a first message with the first private key portion of his/her asymmetric user crypto-key to form a first encrypted message. The third party encrypts the first encrypted message with the second private key portion of the user's crypto-key to form a second encrypted message. A second user can now obtain the first message by applying the public key portion of the other user's crypto-key to decrypt the second encrypted message. This authenticates the first user to the second user and also verifies that the first message is signed by both the first user and the third party.

Authentication of one user to another can also be accomplished by the third party encrypting a first message with the second private key portion of the first user's asymmetric crypto-key to form a first encrypted message. The first user can now encrypt the first encrypted message with the first private key portion of his/her user crypto-key to form a second encrypted message. The second user, can obtain the first message by applying the public key portion of the first user's crypto-key to decrypt the second encrypted message and thereby authenticate the first user and verify that the first message is signed by both the first user and the third party.

In still other cases it may be desirable to limit the utilization of the present invention to temporary key distribution. In such a case, a user first generates a temporary asymmetric crypto-key having a temporary private key portion and an associated temporary public key portion. The user encrypts the temporary public key portion with the first private key portion of his/her user crypto-key to form a first encrypted message. The third party encrypts the first encrypted message with the second private key portion of the user's crypto-key to form a second encrypted message. The other user can now obtain the temporary public key portion by applying the public key portion of the first user's permanent crypto-key and communications between the two users can be encrypted with either the temporary private key portion or the temporary public key portion and decrypted with the other of the temporary key portions.

In yet other cases it may be desirable to direct the implementation of the present invention to symmetric session key distribution. In this case a temporary asymmetric crypto-key having a temporary private key portion and an associated temporary public key portion may be generated. The third party encrypts a symmetric session crypto-key with the second private key portion of the first user's crypto-key to form a first encrypted message. The third party also encrypts the symmetric session crypto-key with the temporary public key portion to form a second encrypted message. The second user obtains the symmetric session crypto-key by applying the temporary private key portion to decrypt the second encrypted message and encrypts the first encrypted message with the temporary private key portion to form a third encrypted message. The first user obtains the symmetric session crypto-key by applying the temporary public key portion and his/her first private key portion to decrypt the third encrypted message. Communications between the first user and the second user can now be encrypted and decrypted with the symmetric session crypto-key.

Symmetric session distribution can alternatively be performed, in accordance with the present invention, by the third party encrypting a first symmetric session key with the second private key portion of a first user's asymmetric crypto-key to form a first encrypted message and with a second symmetric session key to form a second encrypted message. The second user can obtain the first symmetric session key by applying the second symmetric session key to the second encrypted message. The second user encrypts the first encrypted message with the temporary private key portion to form a third encrypted message. The first user can obtain the second symmetric session crypto-key by applying the second temporary key portion and the first private key portion of the first user crypto-key to the third encrypted message. Communication between the first user and the second user can now be encrypted and decrypted with the second symmetric session crypto-key.

In either of the above cases, if appropriately authorized, the symmetric session crypto-key can be disclosed, by the third party, to a third user, such as the Federal Bureau of Investigation (FBI), for eavesdropping on the encrypted communication.

DESCRIPTION OF THE PREFERRED EMBODIMENT

Figure 1:
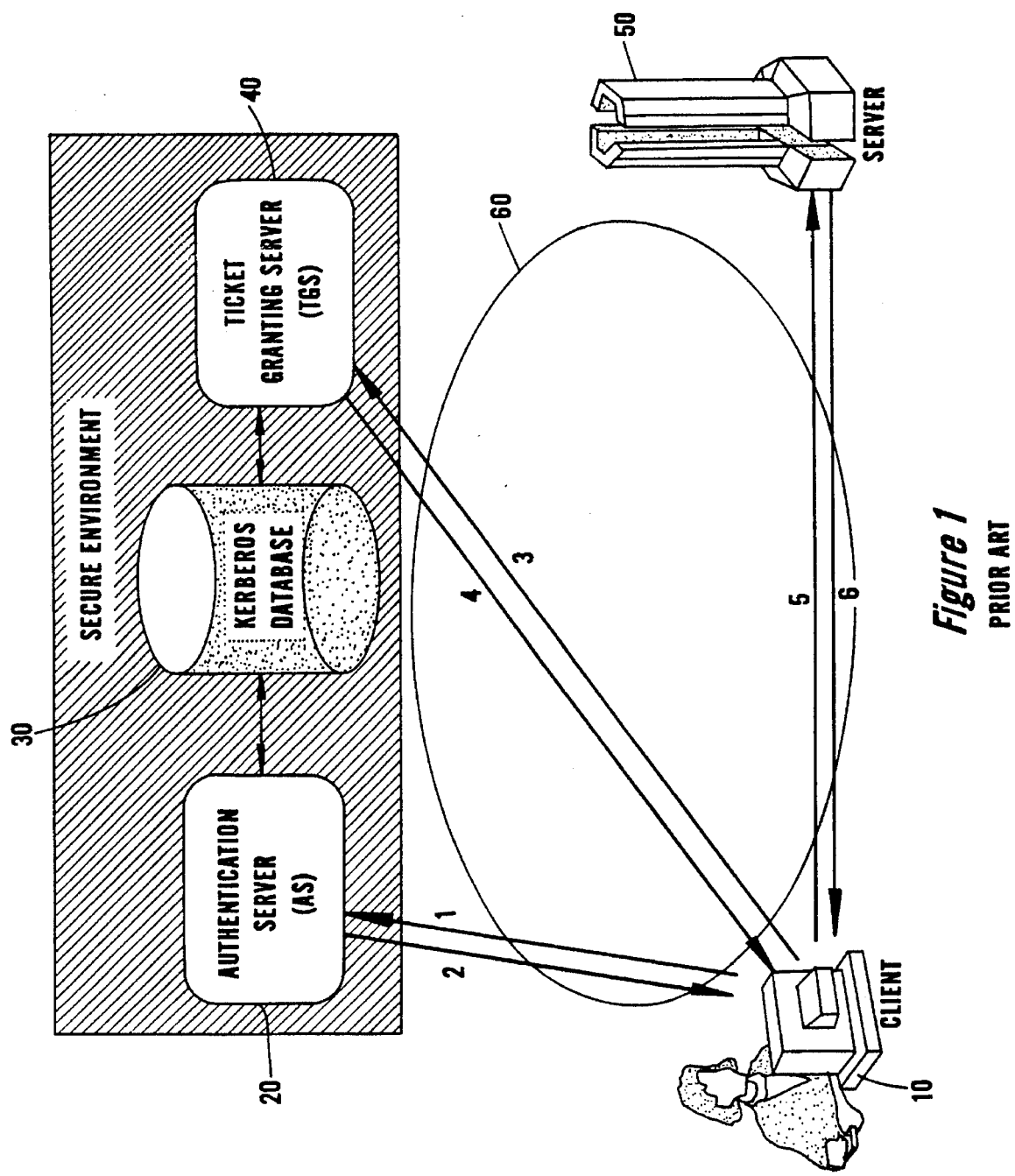
FIG. 1 is a diagram of a conventional Kerberos authentication system.

For purposes of the following description it should be understood that [Message]Kc means the message is encrypted using a symmetric cryptosystem, such as DES, and crypto-key Kc. [Message]Dc means the RSA or some other modular exponentiation operator with the corresponding modulus Nc, i.e. [Message]$D_c$=(Message)$^{Dc}$ modNc.

It should also be understood that the crypto-keys are created, as in any public-key cryptosystem, in accordance with the established policy. The creation and issuance of asymmetric crypto-key could for example, be performed by an organization's Security Dept., perhaps the;same organization that issues Photo IDs, using a terminal connected to a secure computer (e.g. a computer or processor with a tamper proof chip). A user c could access this terminal, enter her or his name, etc. This information is certified by a security officer, whose password or private key the computer knows. The computer then creates an RSA or other public-private key pair ($E_c,N_c,D$), prompts the user for a password, which becomes Dc, the user c's portion of the RSA private key D. The computer computes Dcy which is the portion of the user's private key D which is stored in a secured database, referred to as the Yaksha database. As before, $D=(D_c \times D_{cy}) \bmod \phi(N_c)$. If the computer is also the authentication server acting as the certifying authority, it preferably computes [c,Ec,Nc]Dca as that user's certificate. Any user can obtain user c's public key by applying the certifying authorities public key $E_{CA}N_{CA}$ to the user's certificate. This is a simplification of the complex structure of an actual certificate but is sufficient for purposes of this discussion, Kent, S., "Privacy Enhancement for Internet Electronic Mail: Part II: certificate Based Key Management", INTERNET RFC 1422, February 1993.

Once smart cards are ubiquitous, the user-password becomes irrelevant and the security computer can download the user's (long) private key directly to a smart card. No method of key generation is critical to the functioning of the present invention, hence the above is only meant to be one possible scenario. Since the present invention is not vulnerable to the some of the attacks which conventional Kerberos systems are vulnerable to, the user's private key utilized in accordance with the present invention will have a longer useful life than in Kerberos.

Preferably, for every user, there exists a first private asymmetric crypto-key portion Dc known only to the user. It will be understood that a user may be a person or entity, a server or processor, or a system device such as a switch in a communications network. A second private crypro-key portion Dcy for every user is stored on a secured database, i.e. the Yaksha database. Certificates exist on a certifying authority's server, which is also referred to as the authentication server, and possibly on other servers and user processors, such as a ticket granting server, of the form [c, Ec, Nc]Dca, and every user knows Eca,Nca which is the certifying authority's public key. All other intermediate key generation information has been destroyed, preferably within the safe confines of the tamper proof chip used to generate the crypto-keys.

Figure 2:
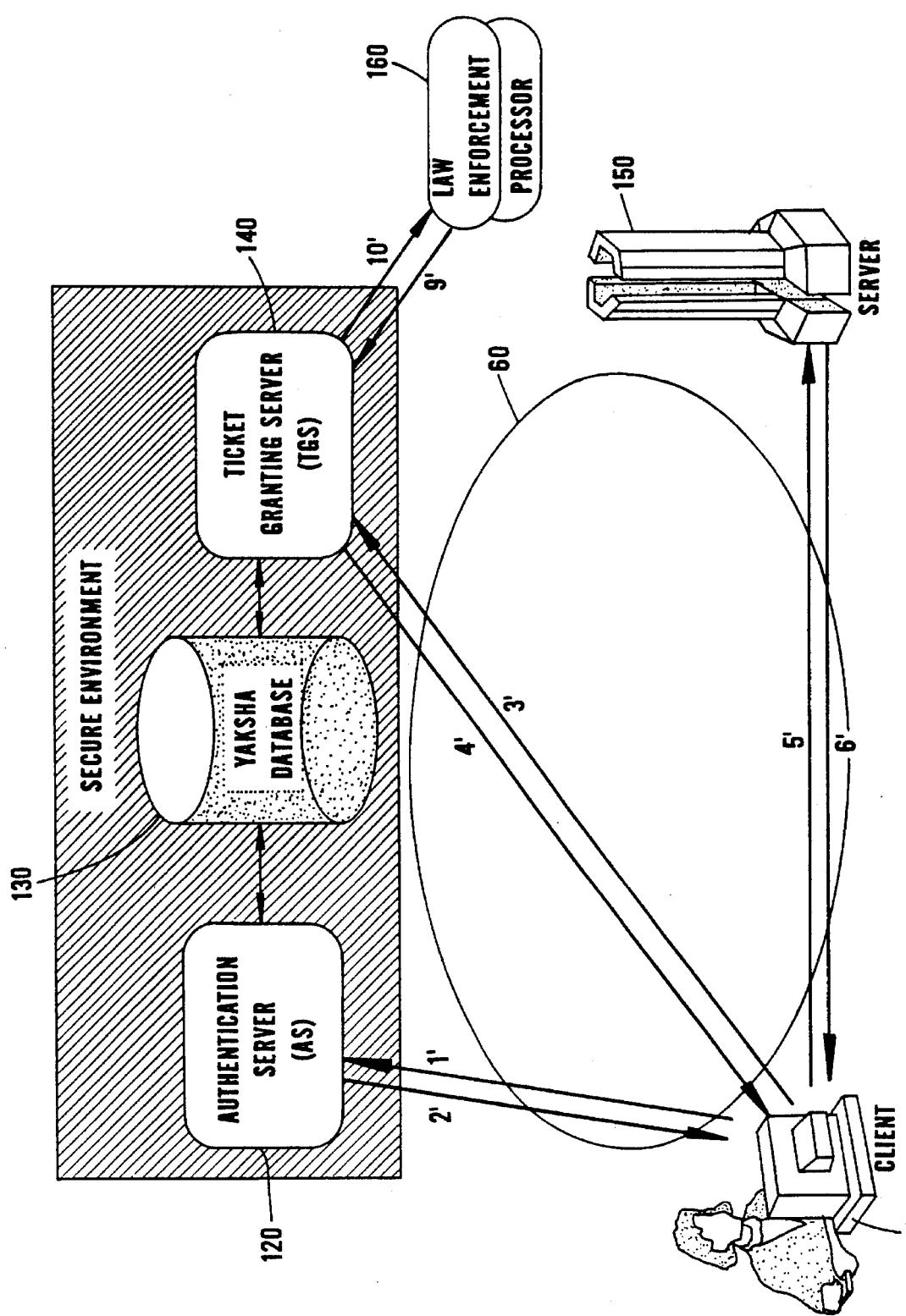
FIG. 2 is a diagram of an authentication system according to the present invention.

The present invention will now be described with reference to FIGS. 2, 3A, 3B and 4. FIG. 2 is an exemplary embodiment of the system and FIGS. 3A, 3B and 4 illustrate the steps performed by the various system components to provide enhanced system security and flexibility, in accordance with the present invention.

Referring first to FIG. 2, as shown the system includes a personal computer, workstation or other type of processor 110 operated by a user c. The processor 110 is connected to network 60 which is identical to the network shown in FIG. 1. The processor 110 can communicate with an authentication server 120, ticket granting server 140 and a service server 150 via the network. A YAKSHA database 130 is directly linked to the authentication server 120 and the ticket granting server 140. A processor or server 160 is also a user of the system and is connected to the system via the network 60. As noted above, each user, including each server, preferably has an asymmetric crypto key assigned to it. The key is made up of a public-private key pair, the public portion of which is known to all users. The private portion of the key is divided into a user portion $D_c$ which is known only to the applicable user and a second portion $D_{cy}$ which is stored on the YAKSHA database 130 and accessible only to the authentication server 120 and ticket granting server 140.

As will be described below, each of the messages transmitted in a conventional Kerberos type environment will have a corresponding message in the system and method of the present invention. As shown in FIG. 2, these messages are designated 1' through 6'.

Figure 3A:
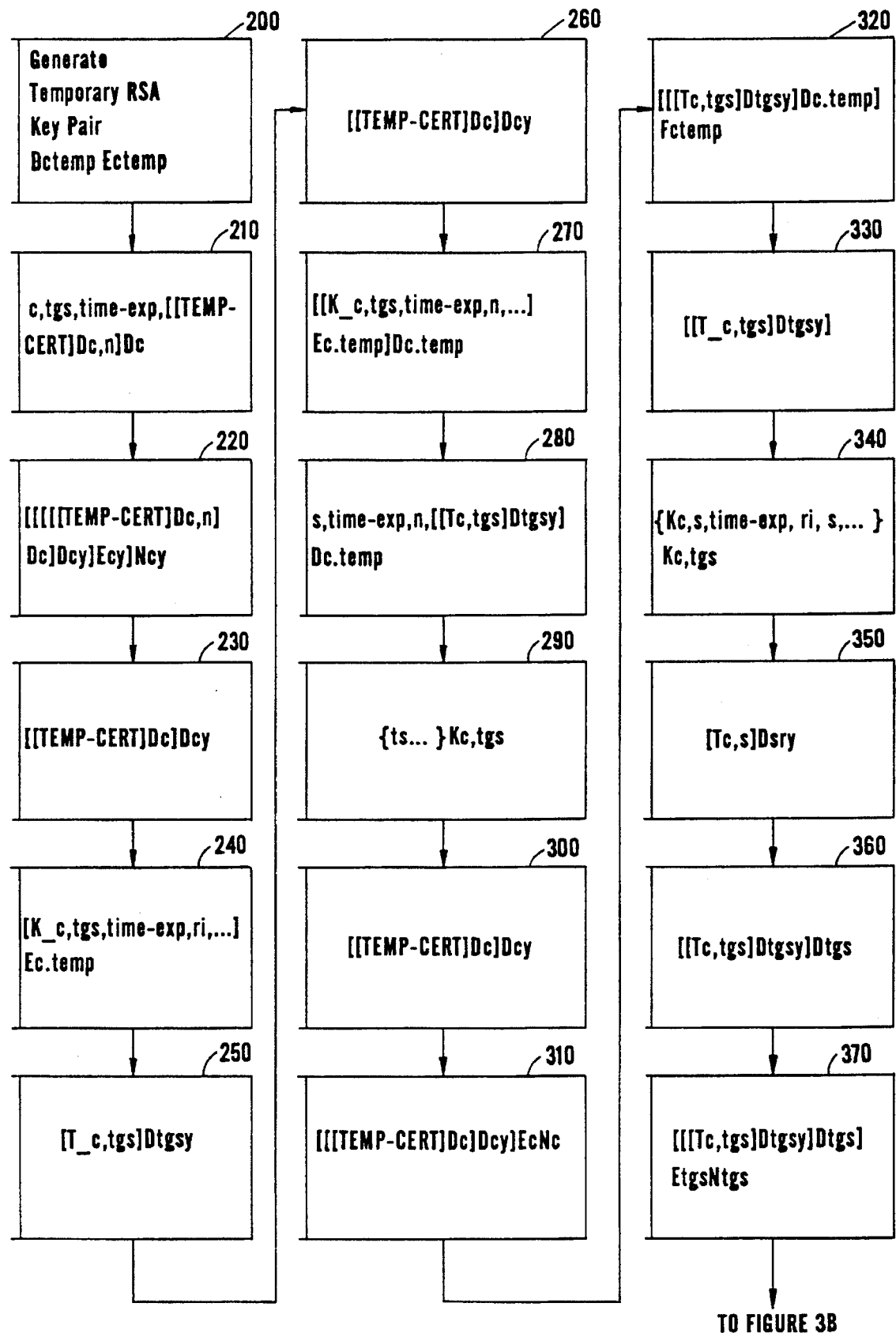
FIGS. 3A and 3B are flow diagrams illustrating the steps for securing communications in accordance with the present invention.
Figure 3B:
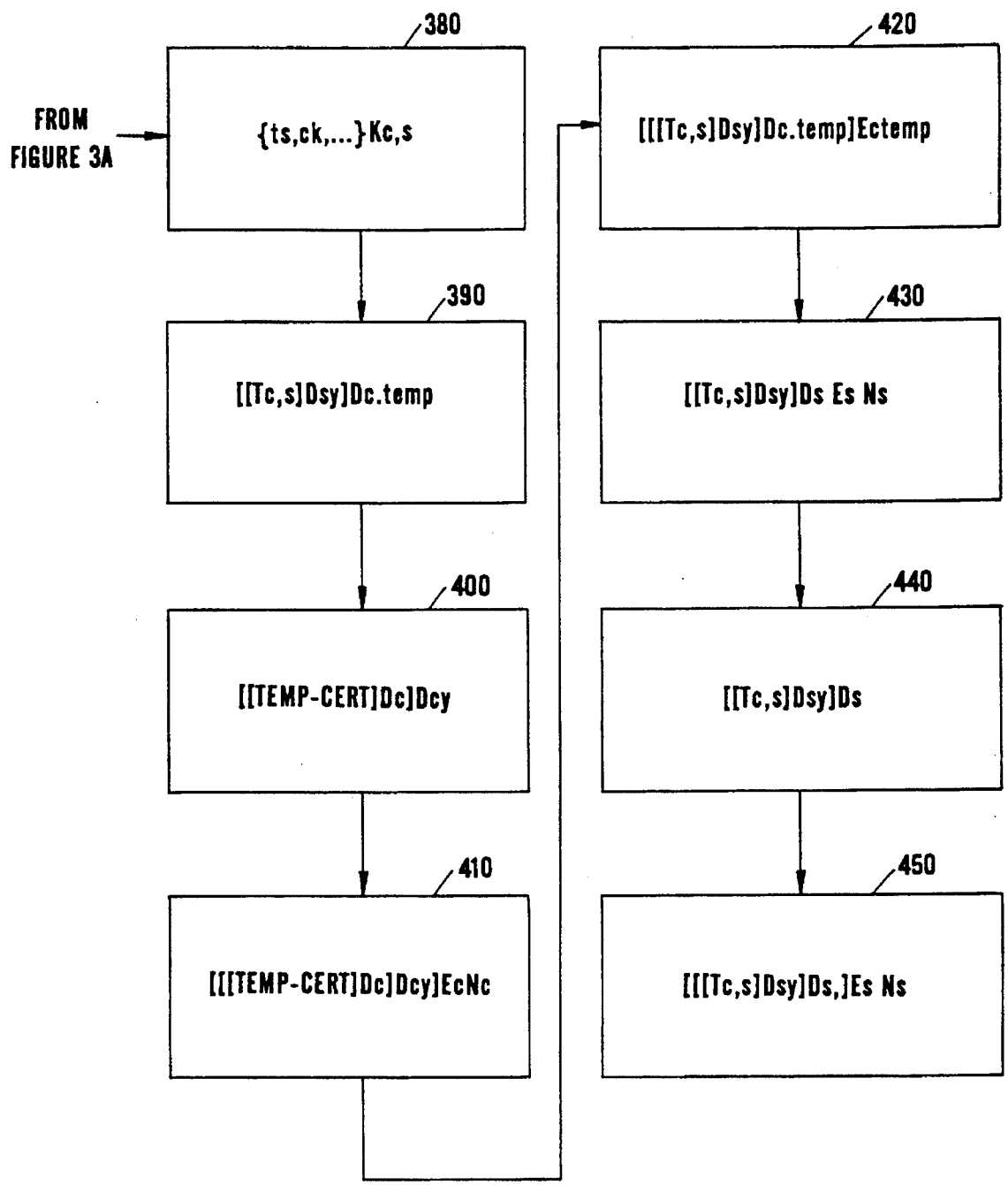
Figure 4:
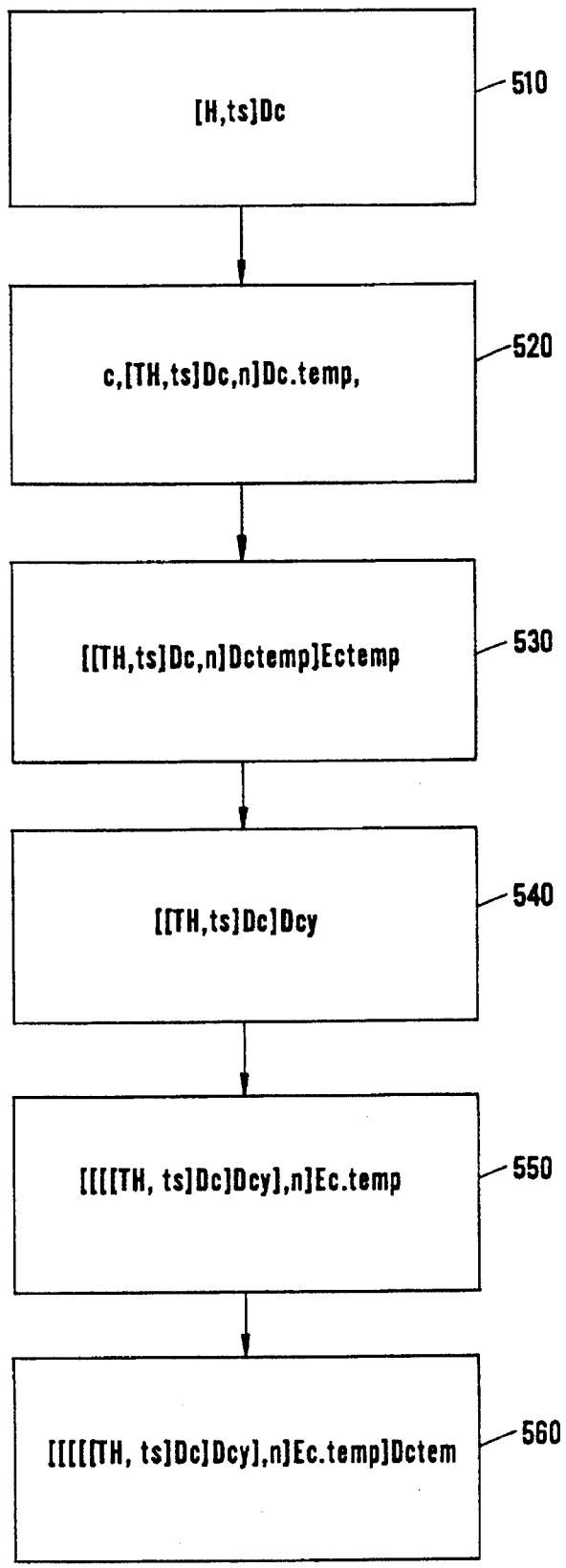
FIG. 4 is a flow diagram illustrating the steps for forming joint signatures in,accordance with the present invention.

Referring now to FIGS. 1, 2, 3A and 3B, in step 200 of FIG. 3A, a temporary RSA key pair Dctemp, Ectemp and Nctemp are generated by processor 110. In Kerberos the initial as_req, as_rep message 1 of FIG. 1 is:

Kerberos:as_req: c,tgs,time-exp, n. (1)

The corresponding message 1' of FIG. 2 is generated in step 210 of FIG. 3A and transmitted over network 60 by processor 110 of FIG. 2 is:

Yaksha:as_req: c,tgs,time-exp, [TEMP-CERT]Dc, n]Dc (1')

In message 1' TEMP-CERT contains (c,Ec.temp, Nc.temp, expiry-time, etc.) where Ec.temp, Nc.temp is the public portion of the temporary RSA private-public key pair which the user c generated on processor 110, and expiry-time, is the time interval or period during which the temporary RSA key pair is valid. The time interval of validity will vary depending on the application but may nominally be set to correspond to one business day or some portion thereof. The TEMP-CERT is encrypted and hence "signed" with the user's portion of the long term private key, Dc. This structure is then concatenated with a random number string n, and again "encrypted" with Dc. Accordingly, an attacker who might later see TEMP-CERT, is prevented from seeing [TEMP-CERT]Dc and mounting a dictionary attack by taking guesses at Dc and checking if [TEMP-CERT]guess= [TEMP-CERT]Dc.

The authentication server 120 receives message 1' and performs [[[[TEMP-CERT]Dc,n]Dc]Dcy]Ecy], as indicated in step 220 of FIG. 3A, to recover [TEMP-CERT]Dc and n. The server 120 retrieves $D_{cy}$ from storage in Yaksha database 130. The server 120 then completes the signature on the temporary certificate by performing, in step 230 of FIG. 3A, [[TEMP-CERT]Dc]Dcy. Observe that by performing [[[TEMP-CERT]Dc]Dcy]Ecy and successfully recovering the TEMP-CERT, the authentication server 120 can authenticate the user. It should also be noted that, in recovering TEMP-CERT, the server 120 recovers Ectemp, Nctemp.

At this point in Kerberos the reply to the user, represented as message 2 in FIG. 1, is:

Kerberos:—as_rep: {Kc,tgs,time-exp, n, . . . } Kc,{Tc,tgs}Ktgs(2)

The corresponding message 2' generated by server 120 of FIG. 2 in steps 240 through 260 of FIG. 3A and transmitted via network 60 is:

Yaksha: as_rep: [Kc,tgs,time-exp, n, . . . ]Ec.temp, [Tc,tgs]Dtgsy,
[[TEMP-CERT]Dc]Dcy (2')

It will be observed that the first two components of messages 2 and 2' are identical, except that, in message 2', the encryption is performed using modular exponentiation and using different keys. The third component of message 2' is the certificate signed by both the processor 110 and the server 120 verifying the authenticity of the temporary public-private key pair. The processor 110, after receipt of message 2', can "decrypt" the first part of the message 2' using Dc.temp which only it knows, to recover the usual Kerberos information as indicated in step 270 of FIG. 3A. The second portion of message 2' is the ticket granting ticket encrypted by server 120 with the portion $D_{tgsy}$ of the ticket granting server 140 RSA private key which is retrieved from Yaksha database 130, It should be noted that the user private key Dc is not utilized in this transaction or communication other than in connection with messages 1' and 2'. Nor is the other portion of this private key, namely, Dcy used again, thus effectively preventing any dictionary attacks against Dc. However, Dc and Dcy make their "presence felt" since they have been used to encrypt and thus sign, the temporary public key, Ectemp and now the user, using processor 110, can "sign" messages with the corresponding private temporary key Dctemp, which is a regular full size RSA key invulnerable to password guessing attacks, without danger of revealing Dc. Further, a message can be sent securely to the user c encrypted under Ec.temp, by any entity that sees the temporary certificate.

In Kerberos the request, in message 3 of FIG. 1, to the ticket granting server 40 takes the form:

Kerberos:tgs_req:s,time-exp,n,{Tc,tgs}Ktgs, {ts . . . }Kc,tgs (3)

The only modifications to this message 3 made in message 3' of FIG. 2, are to attach the temporary certificate TEMP-CERT to the message 3', and to take the encrypted ticket from message 2', i.e. [Tc,tgs]Dtgsy, and to sign it using the temporary private key, Dc.temp. The first modification allows the ticket granting server 140 to retrieve Ec.temp, Nc.temp from TEMP-CERT and the second modification guarantees that a compromised authentication server 120 cannot generate a valid ticket for a "fake" user. The resulting message which is generated by the user using processor 110 and transmitted over network 60, and as indicated in steps 280–300 of FIG. 3A is:

Yaksha:tgs_req: s,time-exp,n,[[Tc,tgs]Dtgsy]Dc.temp, {ts . . . }Kc,tgs,[[TEMP-CERT]Dc]Dcy (3')

The ticket granting server 140 first recovers, for example from the user's permanent certificate, the user's public key portion Ec,Nc, uses this to recover the TEMP-CERT in step 310 of FIG. 3A. The server 140 then uses the temporary public key which is contained in the temporary certificate TEMP-CERT to retrieve [Tc,tgs]Dtgsy in step 320 of FIG. 3A, and then uses its private key Dgts and public key Etgs,Ntgs to recover the ticket Tc,tgs in step 330 of FIG. 3A.

At this point the ticket granting service 140 has authenticated the user, and the tgs_rep message 4 of FIG. 1 is:

Kerberos:tgs_rep: {Kc,s,time-exp,n,s, . . . }Kc,tgs,{Tc,s}Ks    (4)

Message 4 could be utilized almost unchanged. For instance, simply by replacing {Tc,s}Ks with [Tc,s]Dsy. However, in such a case mutual authentication is not achieved and a compromised server 120 could spoof the user into believing it is talking to the server 140 when it is not. So the return message 4' of FIG. 2 is formed to contain proof of the authenticity of server 140. Since the user processor 110 already knows [Tc,tgs]Dtgsy which it received in step 280 of FIG. 3A as part of message 2', the server 140 completes the signature on this message in step 340 of FIG. 3A using its portion of its private key Dgts and returns the result to the user via network 60. The tgs_rep message 4' of FIG. 2, as indicated in steps 340–360 of FIG. 3A is:

Yaksha:tgs_rep:{Kc,s,time-exp,n,s, . . . }Kc,tgs,[Tc,s]Dsy, [[Tc, tgs]Dtgsy]Dtgs    (4')

In appropriate situations, a message 9' requesting access to the session key Kc may be forwarded to the server 140 via the network 60 from the law enforcement processor or server 160. Assuming appropriate authority can be verified, such as by using the previously described authentication process, the server 140 forwards, in message 10', the session key to the processor 160 thus facilitating a legal wiretap being established on communications between the processor 110 and the server 150. It will be noted that this allows eavesdropping by the law enforcement processor 160 of communications over the network 60 between processor 110 and server 150 during the session, Without disclosing to the law enforcement processor 160 the long term private keys of either user. Thus, the long term security of the system has not been jeopardized.

The client via processor 110 retrieves message 4' and, for example using the server 140 permanent certificate, recovers the public key Etgs,Ntgs for server 140 and verifies in step 370 of FIG. 3A that [[Tc.tgs]Dtgsy]Dtgs is the signature on a valid ticket Tc,tgs.

The Kerberos messages 3 and 5 are fundamentally identical, the former being a special type of request to a server. Similarly, message 5' of FIG. 2 generated by user processor 110 is step 380–400 of FIG. 3B and communicated via network 60 is identical to message 3' of FIG. 2. The messages 5 of FIG. 1 and 5' of FIG. 2 are:

Kerberos:ap_req:{ts,ck, . . . }Kc,s{Tc,s}Ks    (5)

Yaksha:{ts,ck, . . . }Kc,s,[[Tc,s]Dsy]Dc.temp,[[TEMP-CERT]Dc] Dcy    (5')

It will be noted that message 5' has a general form which is similar to the message 3' generated in steps 280–300 of FIG. 3A. Thus, server 150 will perform steps similar to those shown in steps 310–330 of FIG. 3A in corresponding steps 410–430 of FIG. 3B. These steps will not be further described to avoid unnecessary duplication.

Mutual authentication is again mandated and the server 150 must prove its knowledge of its long term private key Ds. As in message 4' of FIG. 2 this is achieved by the server 150 sending back in message 6' of FIG. 2, via network 60, the service ticket Tc,s, with the signature completed. This allows the authenticity of server 150 to be verified by processor 110, in step 450 of FIG. 3B, using the long term public key $E_s N_s$ of server 150. Consequently messages 6 of FIG. 1 and 6' of FIG. 2, the later of which is generated by server 150 in step 440, are:

Kerberos:ap_rep:{ts}Kc,s    (6)

Yaksha: ap_rep:[[Tc,s]Dsy]Ds    (6')

It will be observed that both messages 4' and 6' are modified versions of messages 4 and 6, respectively, which facilitate mutual authentication, without having to trust the server 120 or server 140.

The forming of joint signatures in accordance with the present invention will now be described with reference to FIGS. 2 and 4. FIG. 4 illustrates the steps performed by the various system components to form a joint signature on a message and thus provide for non-repudiation.

Kerberos does not perform joint signatures, so the following messages do not have a Kerberos counterpart. Rather these messages are a modification of the signature protocol described in Page J. and R. Plant, "A Secure Joint Signature and Key Exchange System", removed for anonymous review. The modified messages significantly improve the security of the system against a potential dictionary attack. The messages are:

Yaksha:sign_req:c,[[H,ts]Dc,n]Dc.temp,[[TEMP-CERT]Dc,n]Dc(7')

Yaksha: sign_rep: [[[[H,ts]Dc]Dcy],n]Ec.temp    (8')

In forming joint signatures, the temporary asymmetric crypto-key, generated by processor 110 of FIG. 2, as described in step 200 of FIG. 3A, having a private temporary key portion Dctemp and an associated public temporary key portion Ectemp Nctemp, is utilized. The public temporary key portion Ectemp Nctemp is encrypted, as part of the temporary certificate TEMP-CERT, with the long term private key portion Dc of the user c to form a first encrypted message as in step 210 of FIG. 3A. The public temporary key portion Ectemp Nctemp is obtained by, for example, the authentication server 120 of FIG. 2, by applying the second private key portion Dcy and public key portion Ecy Ncy of user c to the first encrypted message, as in step 220 of FIG. 3A, to authenticate user c to the authentication server 120. These steps have not been reiterated in FIG. 4. Thus, the same temporary public-private key pair are used to perform both mutual authentication, as described with reference to FIGS. 3A and 3B, and joint signatures between the user and the server.

Preferably, the user c using processor 110, in step 510 of FIG. 4, signs, with private key portion Dc known only to user c, a hash message H, concatenated, optionally, with a time stamp ts to add redundancy to the message, although in practice, a signature would often have some well defined format and the time stamp may not be necessary. In step 520 of FIG. 4, the user, via processor 110, concatenates this signed message with a random number string n to prevent dictionary attacks of the form [H,ts]guess, and then signs again with the private temporary key portion Dc.temp. Message 7' is formed by adding [[TEMP-CERT]Dc,n]Dc which includes the public temporary key portion Ectemp Nctemp as described in step 210 of FIG. 3A. Processor 110 transmits the message 7' over the network 60. On receipt of message 7', the authentication server 120 first unlocks the TEMP-CERT, just as in step 220 of FIG. 3A, and recovers the temporary public key Ectemp Nctemp. Server 120 uses, in step 530 of FIG. 4, the public temporary key portion Ectemp to recover [H,ts]Dc and n. The server 120 then, in step 540, computes [[H,ts]Dc]Dcy, having retrieved Dcy from Yaksha database 130, which serves as the signature of server 120 on the hash message and time stamp. Server 120 then, in step 550 of FIG. 4, concatenates the jointly signed hash message and time stamp with a random number string n, encrypts the jointly signed message and n using the temporary public key Ectemp and transmits this encrypted message via network 60. The user can recover the jointly signed hash message and time stamp in step 560 by applying, via processor 110, the temporary private key Dctemp known only to user c, and then verify the authenticity of the signature using it's long-term public key EcNc.

In accordance with the present invention, in order for a user to authenticate itself to the certification or authentication server, and visa versa, the user must reveal knowledge of Dc to the server, and the server must reveal knowledge of Dcy to the user. Further, when a user receives a ticket from another user it requires proof that the authentication server has vouched for the ticket, and further, unlike in conventional Kerberos, requires proof that the user has requested the ticket, i.e. it trusts neither the user nor the authentication server individually, but it trusts the message if both vouch for it. Similarly, the mutual authentication response to the initiating user requires a message vouched for by both the other user and the authentication server.

However, like in Kerberos, the user's private key Dc is stored for no more than a short, i.e. the minimum, period of time. Hence a temporary RSA private-public key pair is generated on the fly, that is on-line in real time, and the user and the authentication server collaborate to sign the public portion of this temporary key to create a temporary certificate that is valid for, say, eight hours. It will be noted that the authenticity of this temporary pair is verified using the long term public key. Further, the authentication server never sees the private key portion of the temporary pair. This entire artifice will disappear once smart cards are ubiquitous, and computations involving a user's private key occur inside the smart card connected to the computer. Also, legal wiretaps can be established without the disclosure of users' long term private keys. All of the above is achieved, in accordance with the present invention, with minimal changes to the conventional Kerberos protocol. Preferably, users can retrieve certificates from a particular server other than the authentication server. Alternately, the appropriate certificates could be attached to messages from the authentication server.

As described above, the present invention provides a system and method for securing communications in which the compromise of a central database, such as the secured database in a conventional Kerberos system, will not be catastrophic to the overall system security. The system and method of the present invention are also less vulnerable to dictionary attacks than conventional systems and provide a way for one user to authenticate itself to another user. The described system and method facilitate digital signatures being placed on a message and thereby provide for non-repudiation. Additionally the system and method of the present invention can be implemented to enhance security in conventional Kerberos systems with minimum changes to the standard Kerberos protocol and are compatible with the use of "smart cards". Finally, the described system and method allow the reuse of an authentication infrastructure for digital signatures.

It will also be recognized by those skilled in the that various features and aspects of the above described invention may be used individually or jointly. For example aspects of the invention relating to authentication, joint signatures and session key exchange may be implemented together or individually as may be desired for a particular application. Additionally, although in the description of the preferred embodiments of the invention the public key portion of the user's public/private key pair is applied by specific users, it will be understood that the application of the public key portion of the user's public/private key pair in, for example, authentication and key exchange, can often be performed by either user. Finally, although the preferred embodiments are described in the context of a Kerberos type system, those skilled in the art will recognize that the present invention can be beneficially utilized in any crypto-system having a secure central data base in which to store crypto-keys.

What is claimed:

1. A method for securing communications over a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion, said method for securing communications between at least a first and second of said plurality of users comprising the steps of:

generating, for the first user, a temporary asymmetric crypto-key having a first temporary key portion and an associated second temporary key portion;

encrypting said second temporary key portion with the first private key portion of a first user crypto-key associated with the first user to form a first encrypted message;

obtaining, for a third user, the second temporary key portion by applying the second private key portion of the first user crypto-key to the first encrypted message, thereby authenticating the first user to a third user;

further encrypting the first encrypted message with the second private key portion of the first user crypto-key to form a second encrypted message; and obtaining, for the first user, the second temporary key portion by applying the public key portion of the first user crypto-key to decrypt the second encrypted message and thereby authenticating the third user to the first user.

2. A method for securing communications according to claim 1, further comprising the steps of:

encrypting a first message from the third user to the second user and a first symmetric session crypto-key with the second private key portion of a second user crypto-key associated with the second user to form a third encrypted message;

encrypting the first symmetric session crypto-key with the second temporary key portion to form a forth encrypted message, obtaining, for the first user, the first symmetric session crypto-key by applying the first temporary key portion to the decrypt the fourth encrypted message;

encrypting the third encrypted message with the first temporary key portion to form a fifth encrypted message; and obtaining, for the second user, the first message and the first symmetric session crypto-key by applying the second temporary key portion and the first private key portion of the second user crypto-key to decrypt the fifth encrypted message, thereby authenticating the first user and the third user to the second user.

3. A method for securing communications according to claim 1, further comprising the step of obtaining, for the second user, the second temporary key portion by applying the public key portion of the first user crypto-key to decrypt the second encrypted message, thereby authenticating the first and third users to the second user.

4. A method for securing communications according to claim 2, wherein said third user is an authentication server and said second user is a ticket granting server which grants a ticket for service from a fourth user.

5. A method for securing communications according to claim 4, further comprising the step of encrypting a second message from the first user to the second user with the first symmetric session key to form a sixth encrypted message, wherein said first message is an instruction to grant said ticket and said second message is a time stamp.

6. A method for securing communications according to claim 4, further comprising the steps of:

encrypting a third message to the fourth user and a second symmetric session key with the second private key portion of a fourth user crypto-key associated with the fourth user to form a seventh encrypted message;

encrypting the third encrypted message with the first private key portion of the second user crypto-key to form an eight encrypted message;

encrypting the second symmetric session key with the first symmetric session key to form a ninth encrypted message;

obtaining, for the first user, the first message and the first symmetric session key by applying the public key portion of the second user crypto-key to the eight encrypted messages, thereby authenticating the second user to the first user;

obtaining, for the first user, the second symmetric session key by applying the first symmetric session key to the ninth encrypted message;

encrypting the seventh encrypted message with the first temporary key portion to form a tenth encrypted message; and obtaining, for the fourth user, the third message and the second symmetric session crypto-key by applying the second temporary key portion and the first private key portion of the fourth user crypto-key to the tenth encrypted message and thereby authenticating the first and second users to the fourth user.

7. A method for securing communications according to claim 6, further comprising the steps of:

encrypting the seventh encrypted message with the first private key portion of the fourth user crypto-key to form a twelfth encrypted message; and obtaining, for the first user, the third message and the second symmetric session key by applying the public key portion of the fourth user crypro-key to the twelfth encrypted message and thereby authenticating the fourth user to the first user.

8. A method for securing communications according to claim 6, further comprising the step of obtaining the second temporary key portion by applying the public key portion of the first user crypto-key to decrypt the second encrypted message, thereby authenticating the first and third users to the second user and the first and third users to the fourth user.

9. A method for securing communications according to claim 6, further comprising the step of encrypting a fourth message from the first user to the fourth user with the second symmetric session key to form a eleventh encrypted message, wherein said third message to the fourth user is a ticket instructing the fourth user to provide a service and said fourth message to the fourth user is a time stamp.

10. A method for securing communications according to claim 6, wherein:

the first encrypted message includes a first random number string concatenated with the second temporary key portion;

the fourth encrypted message includes a second random number string concatenated with the first symmetric session crypto-key; and the ninth encrypted message includes a third random number string concatenated with the second symmetric session crypto-key.

11. A method for securing communications according to claim 1, wherein said asymmetrical crypto-keys are applied using modular exponentiation.

12. A method for securing communications according to claim 1, wherein said temporary crypto-key has an associated expiration time.

13. A method for securing communications according to claim 1, further comprising the steps of:

encrypting a hash message with the first private key portion of the first user crypto-key to form a third encrypted message, thereby placing a signature of the first user on the hash message;

encrypting said third encrypted message with said first temporary key portion and with the first private key portion of the first user crypto-key to form a fourth encrypted message;

obtaining, for the third user, the third encrypted message by applying said second temporary key portion and the second private key portion of the first user crypto-key to the fourth encrypted message;

encrypting said third encrypted message with the second private key portion of the first user crypto-key to form a fifth encrypted message, thereby placing a signature of the third user on the hash message; and obtaining, for the second user, the hash message by applying the public key portion of the first user crypto-key to the fifth encrypted message, thereby verifying the joint signatures of the first and third users on the hash message.

14. A method for securing communications according to claim 13, further comprising the step of encrypting said fifth encrypted message with said second temporary key portion.

15. A method for jointly signing communications over a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion, said method for a first and second of said plurality of users jointly signing communications comprising the steps of:

generating, for the first user, a temporary asymmetric crypto-key having a first temporary key portion and an associated second temporary key portion;

encrypting said second temporary key portion with the first private key portion of a first user crypto-key associated with the first user to form a first encrypted message;

encrypting a hash message with the first private key portion of the first user crypto-key to form a second encrypted message, thereby placing a signature of the first user on the hash message;

encrypting said second encrypted message with said first temporary key portion to form a third encrypted message;

obtaining, for the second user, the second temporary key portion by applying the second private key portion of the first user crypto-key to the first encrypted message, thereby authenticating the first user to the second user;

obtaining, for the second user, the second encrypted message by applying said second temporary key portion to the third encrypted message;

encrypting said second encrypted message with the second private key portion of the first user crypto-key to form a fourth encrypted message, thereby placing a signature of the second user on the hash message; and obtaining the hash message by applying the public key portion of the first user crypto-key to the fourth encrypted message, thereby verifying the joint signatures of the first and second users on the hash message.

16. A method for jointly signing communications according to claim 15, further comprising the steps of:

encrypting said fourth encrypted message with said second temporary key portion to form a fifth encrypted message;

encrypting said first encrypted message with the second private key portion of the first user crypto-key to form a sixth encrypted message;

obtaining, for a third user, said second temporary key portion by applying the public key portion of the first user crypto-key to the sixth encrypted message; and obtaining, for the third user said hash message by applying the second temporary public key and the public key portion of the first user crypto-key to the fifth encrypted message;

wherein the third encrypted message includes a first random number string concatenated with the second encrypted message, and the fifth encrypted message includes a second random number string concatenated with the fourth encrypted message.

17. A method for jointly signing communications according to claim 15, wherein said asymmetrical crypto-keys are applied using modular exponentiation.

18. A method for securing communications over a system according to claim 15, wherein said temporary crypto-key has an associated expiration time.

19. A secure communications system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion, said system comprising:

a database having each said second private key portion stored therein;

a first processor connected to a communications network for (i) generating a temporary asymmetric crypto-key having a first temporary key portion and an associated second temporary key portion, (ii) encrypting said second temporary key portion with the first private key portion of a first user crypto-key associated with a first user to form a first encrypted message, and (iii) transmitting said first encrypted message over the communications network; and a second processor connected to the database and to the communications network for (i) retrieving the second private key portion of the first user crypto-key from the database (ii) obtaining the second temporary key portion by applying the second private key portion of the first user crypto-key to the first encrypted message, thereby authenticating the first user, (iii) encrypting the first encrypted message with the second private key portion of the first user crypto-key to form a second encrypted message, and (iv) transmitting the second encrypted message over the communications network;

wherein the first processor obtains the second temporary key portion by applying the public key portion of the first user crypto-key to decrypt the second encrypted message and thereby authenticates a second user.

20. A secure communications system according to claim 19, wherein:

said second processor (i) retrieves the second private key portion of a third user crypto-key associated with a third user from the database, (ii) generates a first symmetric session crypto-key, (iii) encrypts a first message to the third user and the first symmetric session crypto-key with the second private key portion of the third user crypto-key to form a third encrypted message, (iv) encrypts the first symmetric session crypto-key with the second temporary key portion to form a forth encrypted message; and (v) transmits the third and fourth encrypted messages over the communications network; and said first processor (i) obtains the first symmetric session crypto-key by applying the first temporary key portion to the decrypt the fourth encrypted message, and (ii) encrypts the third encrypted message with the first temporary key portion to form a fifth encrypted message, and (iii) transmits the fifth encrypted message over the communications network.

21. A secure communications system according to claim 20, further comprising:

a third processor connected to said communications network for obtaining the first message and the first symmetric session crypto-key by applying the second temporary key portion and the first private key portion of the second user crypto-key to decrypt the fifth encrypted message, thereby authenticating the first user and the second user.

22. A secure communications system according to claim 19, wherein:

said first processor (i) encrypts a hash message with the first private key portion of the first user crypto-key to form a third encrypted message, thereby placing a signature of the first user on the hash message, (ii) encrypts said third encrypted message with said first temporary key portion and with the first private key portion of the first user crypto-key to form a fourth encrypted message, and (iii) transmits said fourth encrypted messages over the network;

said second processor (i) obtains the third encrypted message by applying said second temporary key portion and the second private key portion of the first user crypro-key to the fourth encrypted message, (ii) encrypts said third encrypted message with the second private key portion of the first user crypto-key to form a sixth encrypted message, thereby placing a signature of the second user on the hash message.

23. A secure communications system according to claim 22, further comprising a third processor for obtaining the hash message by applying the public key portion of the first user crypto-key to the sixth encrypted message, thereby verifying the joint signatures of the first and second users.

24. A method for authenticating users of a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for authenticating users comprising the steps of:

a first user encrypting a first message with the first private key portion of a first user crypto-key associated with the first user to form a first encrypted message;

the third party obtaining the first message by applying the second private key portion of the first user crypto-key to the first encrypted message, thereby authenticating the first user to the third party;

the third party encrypting the first encrypted message with the second private key portion of the first user crypto-key to form a second encrypted message; and the first user, obtaining the first message by applying the public key portion of the first user crypto-key to decrypt the second encrypted message and thereby authenticating the third party to the first user.

25. A method for authenticating user of a system according to claim 24, wherein said third party is an authentication server.

26. A method for authenticating users of a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for authenticating users comprising the steps of:

a first user encrypting a first message with the first private key portion of a first user crypto-key associated with the first user to form a first encrypted message;

the third party encrypting the first encrypted message with the second private key portion of the first user crypto-key to form a second encrypted message; and a second user obtaining the first message by applying the public key portion of the first user crypto-key to decrypt the second encrypted message and thereby authenticating the first user to the second user.

27. A method for authenticating user of a system according to claim 26, wherein said step of said second user obtaining said first message verifies that the first message is signed by both the first user and the third party.

28. A method for authenticating user of a system according to claim 26, wherein said third party is an authentication server.

29. A method for authenticating users of a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for authenticating users comprising the steps of:

the third party encrypting a first message with the second private key portion of a first user crypto-key associated with the first user to form a first encrypted message;

a first user encrypting the first encrypted message with the first private key portion of the first user crypto-key to form a second encrypted message;

a second user, obtaining the first message by applying the public key portion of the first user crypto-key to decrypt the second encrypted message and thereby authenticating the first user to the second user.

30. A method for authenticating user of a system according to claim 29, wherein said step of said second user obtaining said first message verifies that the first message is signed by both the first user and the third party.

31. A method for authenticating user of a system according to claim 29, wherein said third party is an authentication server.

32. A method for securing communications over a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for securing communications between at least a first and second of said plurality of users comprising the steps of:

generating a temporary asymmetric crypto-key having a first temporary key portion and an associated second temporary key portion;

the first user encrypting said second temporary key portion with the first private key portion of a first user crypto-key associated with the first user to form a first encrypted message;

the third party encrypting the first encrypted message with the second private key portion of the first user crypto-key to form a second encrypted message;

the second user obtaining said second temporary key portion by applying the public key portion of the first user crypto-key; and encrypting a communication between the first user and the second user with one of either said first temporary key portion or said second temporary key portion and decrypting said encrypted communication with the other of either said first temporary key portion or said second temporary key portion.

33. A method for authenticating user of a system according to claim 32, wherein said third party is an authentication server.

34. A method for securing communications over a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for securing communications between at least a first and second of said plurality of users comprising the steps of:

generating a temporary asymmetric crypto-key having a first temporary key portion and an associated second temporary key portion;

the third party encrypting a symmetric session crypto-key with the second private key portion of a first user crypto-key associated with a first user to form a first encrypted message;

the third party encrypting the symmetric session crypto-key with the second temporary key portion to form a second encrypted message, obtaining, for a second user, the symmetric session crypto-key by applying the first temporary key portion to decrypt the second encrypted message;

encrypting the first encrypted message with the first temporary key portion to form a third encrypted message;

obtaining, for the first user, the symmetric session crypto-key by applying the second temporary key portion and the first private key portion of the first user crypto-key to decrypt the third encrypted message; and encrypting a communication between the first user and the second user with said symmetric session crypto-key.

35. A method for securing communications according to claim 34, further comprising the symmetric session crypto-key being disclosed, by the third party, to a third user for eavesdropping on said encrypted communication.

36. A method for securing communications over a system having a plurality of system users, each said user having an associated asymmetric crypto-key with a public key portion and a corresponding private key portion, each public key portion being accessible to the plurality of system users, each private key portion having a first private key portion known only to the associated user and a corresponding second private key portion known only to a third party, said method for securing communications between at least a first and second of said plurality of users comprising the steps of:

generating a temporary asymmetric crypto-key having a first temporary key portion and, an associated second temporary key portion;

the third party encrypting a first symmetric session key with the second private key portion of a first user crypto-key associated with a first user to form a first encrypted message;

the third party encrypting the first symmetric session key with a second symmetric session key to form a second encrypted message;

obtaining, for a second user, the first symmetric session key by applying the second symmetric session key to the second encrypted message;

the second user encrypting the first encrypted message with the first temporary key portion to form a third encrypted message; obtaining, for the first user, the second symmetric session crypro-key by applying the second temporary key portion and the first private key portion of the first user crypto-key to the third encrypted message; and encrypting a communication between the first user and the second user with said second symmetric session crypto-key.

37. A method for securing communications according to claim 36, further comprising the second symmetric session crypto-key being disclosed, by the third party, to a third user for eavesdropping on said encrypted communication.

* * * * *